(12) United States Patent
Anderson et al.

(10) Patent No.: US 6,765,612 B1
(45) Date of Patent: Jul. 20, 2004

(54) METHOD AND SYSTEM FOR NAMING IMAGES CAPTURED BY A DIGITAL CAMERA

(75) Inventors: Eric C. Anderson, San Jose, CA (US); Mike Masukawa, Los Gatos, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 1405 days.

(21) Appl. No.: 08/761,854

(22) Filed: Dec. 9, 1996

(51) Int. Cl.[7] ................................................. H04N 5/76
(52) U.S. Cl. ................................ 348/231.2; 348/231.7
(58) Field of Search ........................... 348/207, 211, 348/220, 231, 232, 233, 239, 552; 596/429; 386/120

(56) References Cited

U.S. PATENT DOCUMENTS

| | | | | |
|---|---|---|---|---|
| 4,827,347 A | * | 5/1989 | Bell ............................. | 348/231 |
| 5,101,225 A | * | 3/1992 | Wash et al. .................... | 355/40 |
| 5,402,170 A | * | 3/1995 | Parulski et al. ............... | 348/211 |
| 5,563,655 A | * | 10/1996 | Lathrop ........................ | 348/231 |
| 5,633,678 A | * | 5/1997 | Parulski et al. ............... | 348/232 |
| 5,719,978 A | | 2/1998 | Kawamura ................... | 386/120 |
| 5,806,072 A | * | 9/1998 | Kuba et al. ................... | 348/231 |

* cited by examiner

Primary Examiner—Tuan Ho
(74) Attorney, Agent, or Firm—Sawyer Law Group LLP

(57) ABSTRACT

A method and system for minimizing image naming conflicts when capturing a plurality of images in a digital camera. The method and system includes incrementing a count in response to an image being captured, the count being a non-repeating number representing the total number of images captured by the digital camera, and associating the count with the captured image to provide a unique image identifier.

8 Claims, 6 Drawing Sheets

METHOD AND SYSTEM FOR NAMING IMAGES CAPTURED BY A DIGITAL CAMERA

FIELD OF THE INVENTION

The present invention relates generally to digital cameras, and more particularly to a method and system for naming images captured by a digital camera.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

The user interface in conventional digital cameras typically includes a view finder in which small versions of the captured images may be displayed to allow a user to review several images at once. By selecting one of the images, the user may then display the full-sized version of the images in the view finder.

The images captured by the digital camera are typically named by numbering the images starting with an initial number, such as the number one, and ending with a maximum number. The images displayed in the view finder may then be identified by their assigned numbers. Once the maximum number of images have been named, the user must delete or download the images to a host computer to clear the camera's memory. Thereafter, the camera begins naming new images starting with the number one again.

This conventional method for naming images results in several naming conflicts that may result in some images being overwritten and lost. One type of naming conflict occurs in cameras that are equipped with some type of removable memory for storing images, such as a flash card. For instance, assume that the removable memory includes a series of old images that are named from one to the maximum number as described above. If the user begins capturing images, the camera will begin naming the new images starting with the number one since the maximum number has been reached. This results in the old images stored on the removable media being overwritten by the new images that have the same names.

Another type of naming conflict occurs when conventional cameras are connected to a host computer for transferring images. Assuming that both the host computer and the camera include stored images, then both the host computer and the camera may have a set of images with the same names. If any attempt is made to download images from the host computer to the camera, then the images with the conflicting names in the camera may be overwritten. Similarly, if any attempt is made to upload images from the camera to the host computer, then the images in the host computer with the conflicting names may be overwritten.

Accordingly, what is needed is an improved method and system for naming images captured by a digital camera. The present invention addresses such a need.

SUMMARY OF THE INVENTION

The present invention provides a method and system for minimizing image naming conflicts when capturing a plurality of images in a digital camera. The method and system includes incrementing a count in response to an image being captured, the count being a non-repeating number representing the total number of images captured by the digital camera, and associating the count with the captured image to provide a unique image identifier.

In another aspect of the present invention, the count of the total number of captured images is stored in an EEPROM memory in the digital camera to maintain its value under all power conditions, including power failures.

According to the system and method disclosed herein, the present invention significantly reduces naming conflicts when transferring images to or from a host computer or a removable memory because each image, whether new or old, is provided with a unique identifier.

DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for naming images captured by a digital camera.

Figure 1:
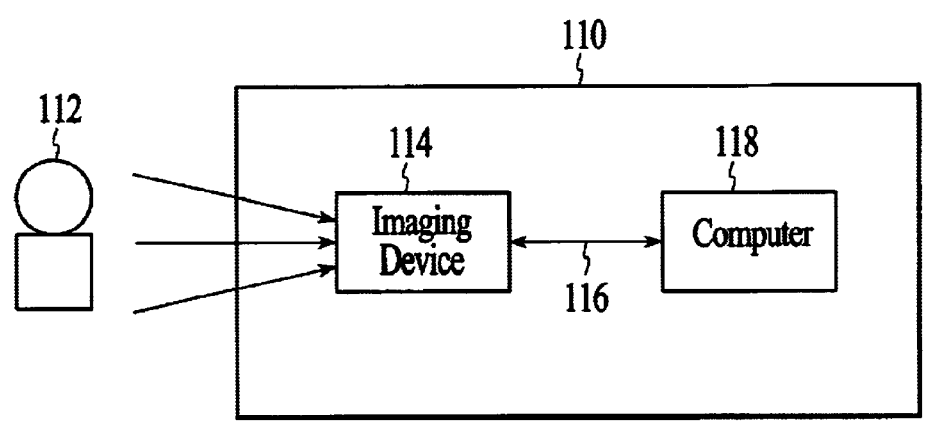
FIG. 1 is a block diagram of a digital camera that operates in accordance with the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
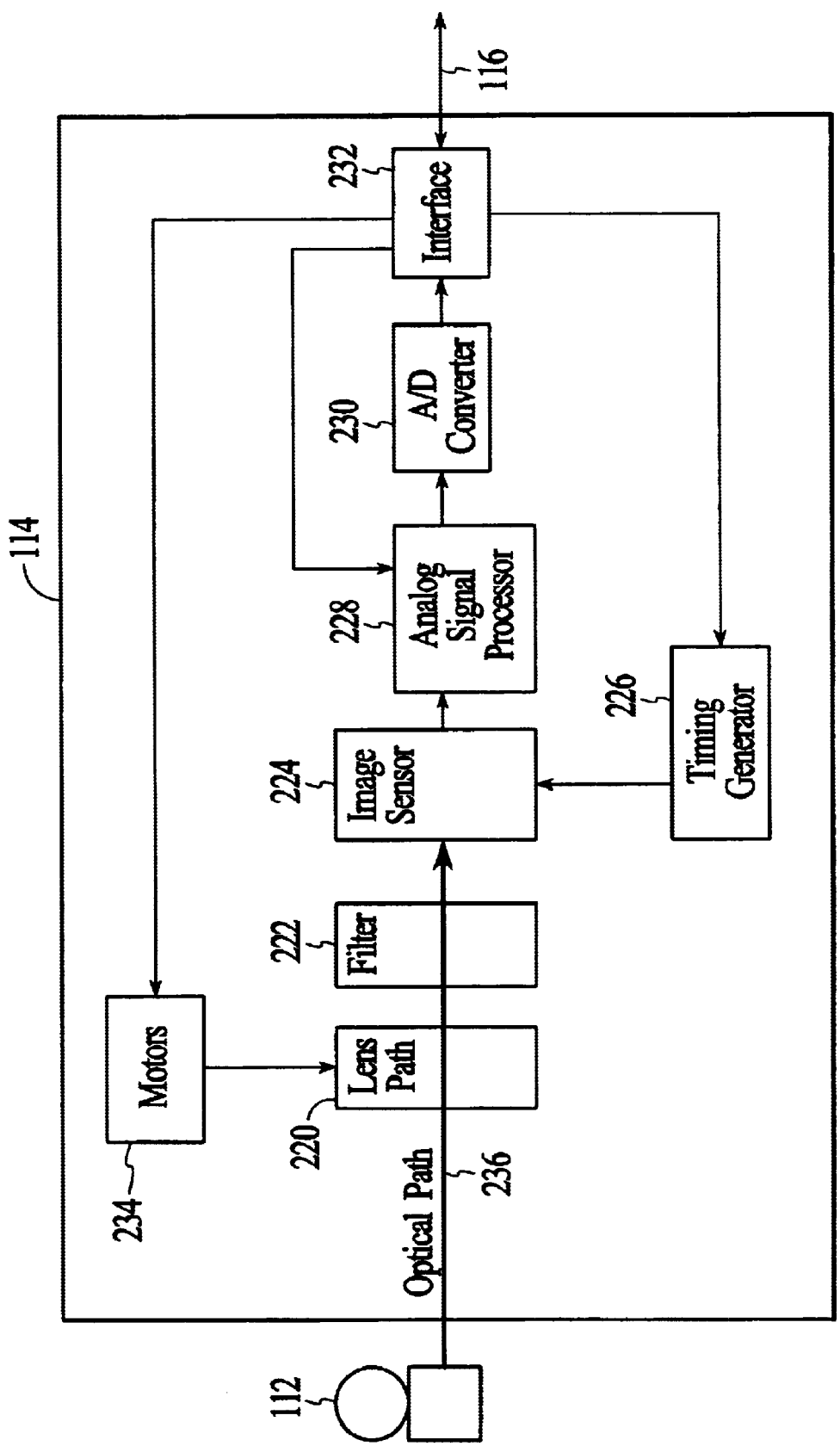
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
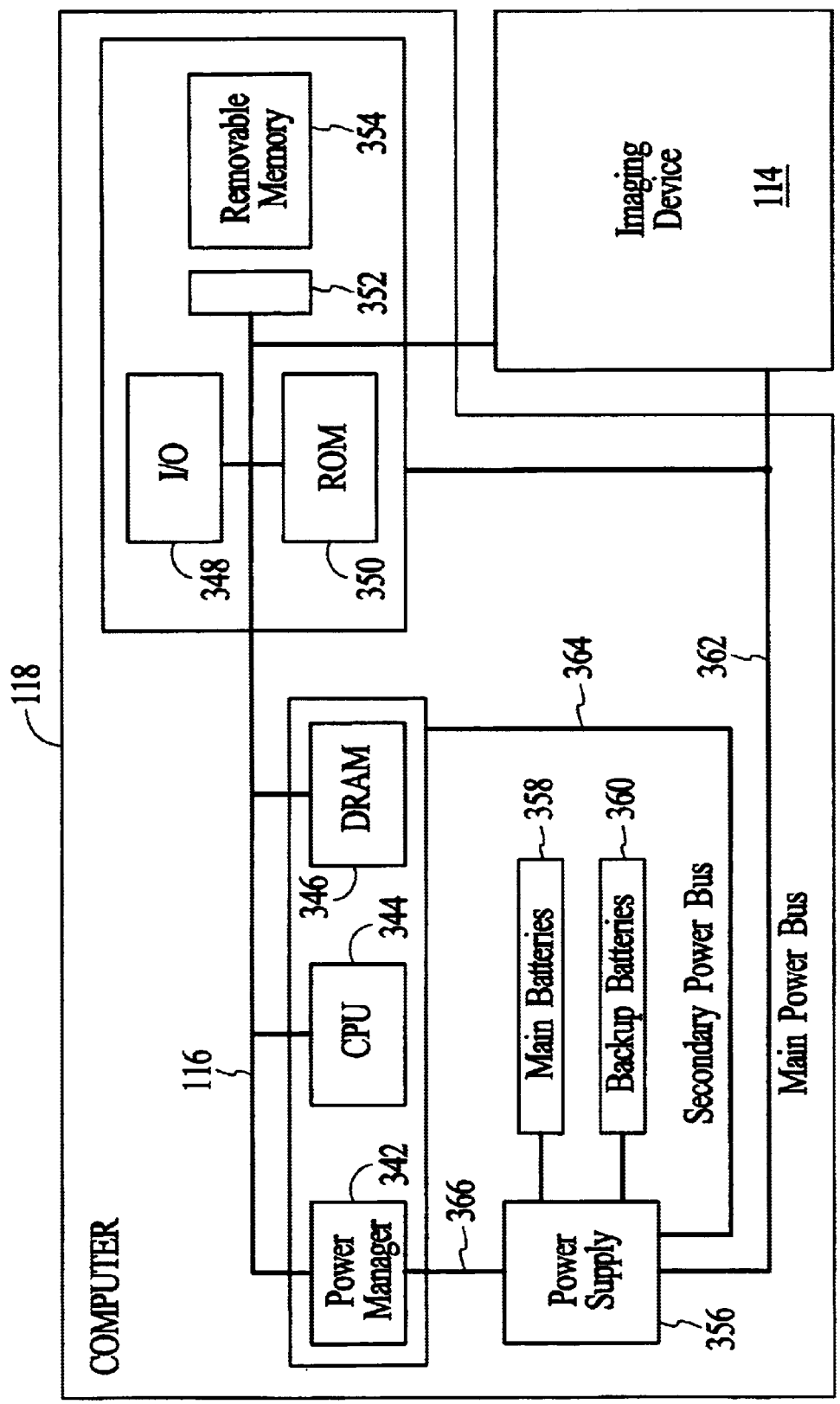
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Figure 4:
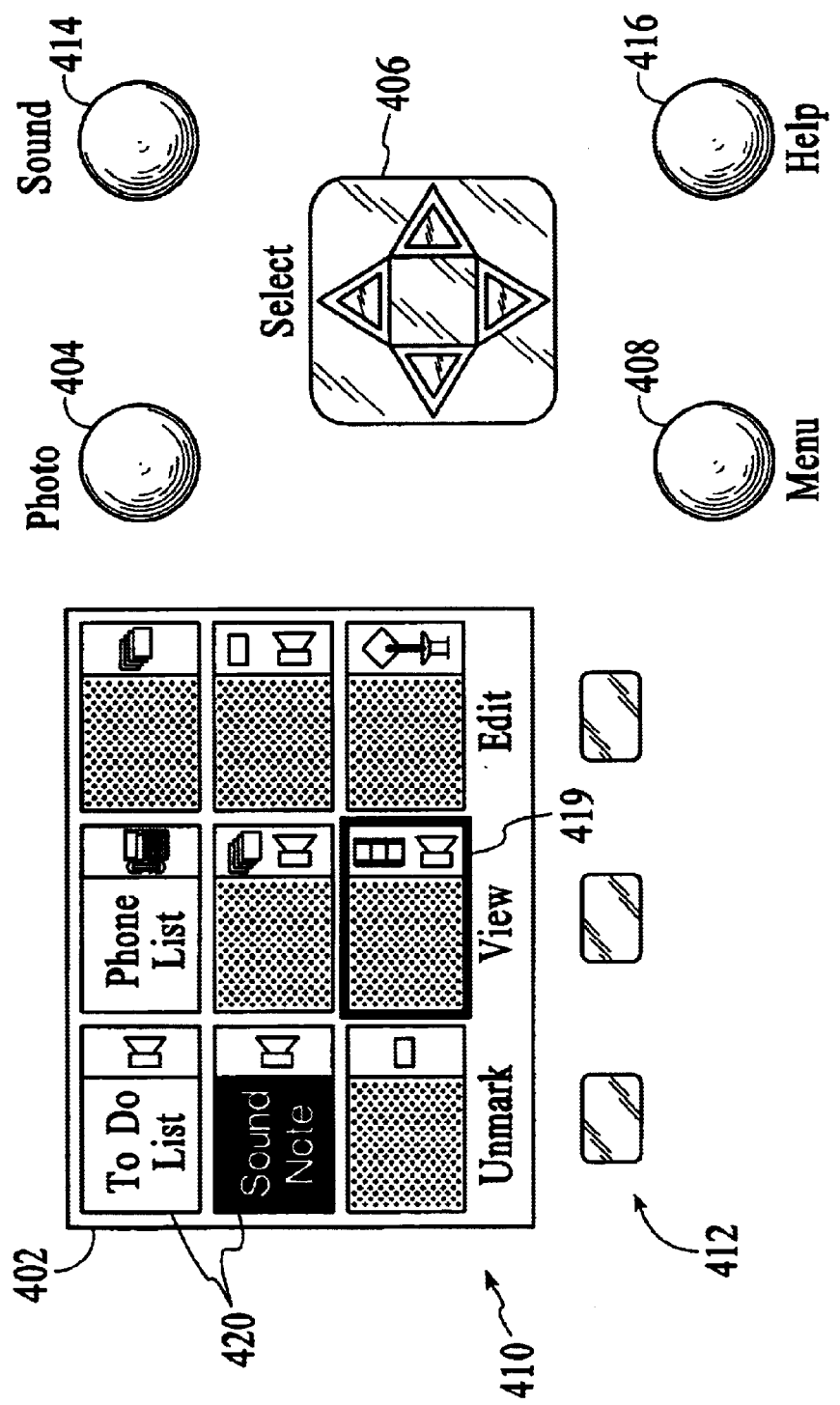
FIG. 4 is a block diagram depicting a user interface for the digital camera.

FIG. 4 is a block diagram depicting a user interface 400 for the digital camera as described in co-pending U.S. patent application Ser. No. 08/716,018, entitled "A Method and System For Displaying Images In The Interface of a Digital Camera," which is assigned to the Assignee of the present application and incorporated herein by reference. In one preferred embodiment, the user interface includes a view finder 402, an image capture button called a photo button 404, a four-way navigation control button 406, a menu button 408, a menu area 410 within the view finder 402, and function keys 412. The user interface 400 may also include an optional sound button 414, and a help button 416.

Referring again to FIGS. 1 and 4, the user interface 400 operates in two modes: live view finder mode and review mode. In a preferred embodiment, the photo button 404 is a two position button. The live view finder mode begins when a user aims the camera at an object 112 and presses the photo button 404 into the first position. Once this occurs, the view finder 402 displays the image of the object 112 as shown through the camera's imaging device 114. The user may then press the photo button 404 into the second position to capture the image shown in the view 5 finder 402. Review mode begins by pressing any other button on the interface 400.

Referring again to FIG. 4, once the digital camera 110 is placed in the review mode, the view finder 402 displays a series of cells 420 that represent the digital images that have been captured in the digital camera. The view finder 402 is shown here as displaying nine Image cells 420. Each cell 420 displays a small-sized image corresponding to one of the captured images. The user may navigate through the series of displayed cells 420 in the view finder 402 using the four-way navigation control button 406. As the user navigates through the cells 420, the old image cells 420 are scrolled-off the view finder 402 and replaced by new image cells 420 representing other images stored in the camera.

The cell 420 currently selected by the four-way navigation control 406 is encircled with a highlighted area 419, which is shown as a selection rectangle. Other shapes for the highlighted area are also suitable. Once a cell 420 has been selected, the user may depress one of the function buttons 412 to in order to display a full-sized version of the image in the view finder 402.

Figures 5, 6:
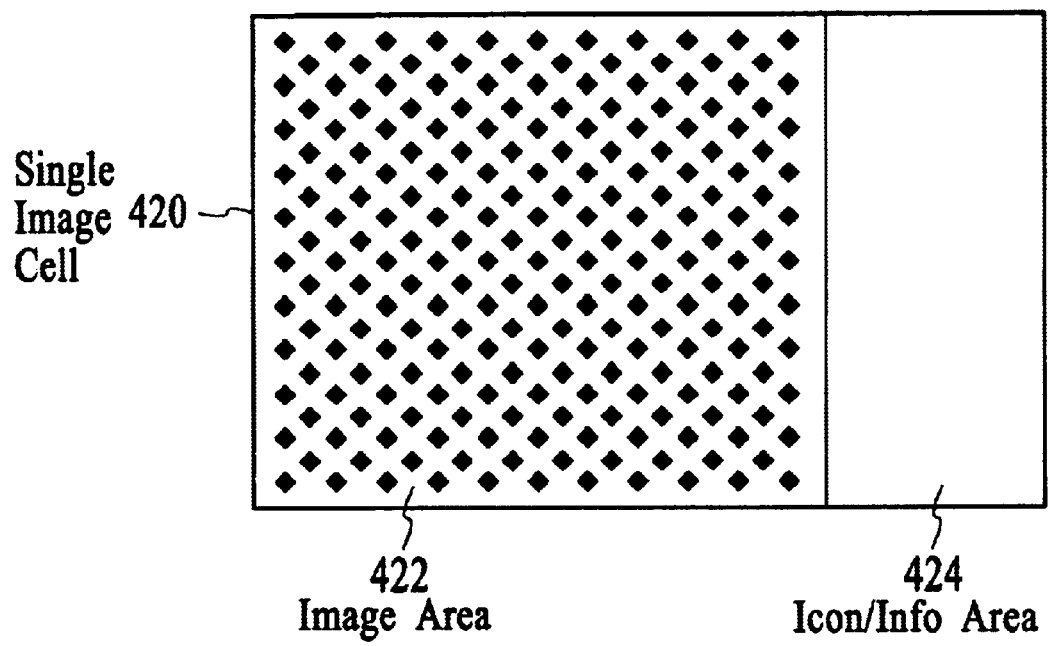
FIG. 5 is block diagram illustrating the format of a cell.
FIG. 6 is a table listing example media types and corresponding icons that may be associated with a captured image.

FIG. 5 is a block diagram illustrating the format of a cell 420. Each cell 420 includes an image area 422 and an icon/information area 424. The icon/information area 424 is for displaying one or more graphical icons, and/or for displaying text information. The icons and text information displayed in the icon/information area 424 indicate to the user what media types have been associated with the image displayed in the image area 422. Indicating what types of media have been associated with an object means identifying what combination of specific types of media are included in that object. Examples of specific types of media include graphic images, text, and sound.

FIG. 6 is a table listing example media types and corresponding icons that may be associated with a captured image. The media type of a captured image may represent a single image, a time lapse or burst image, a movie clip, a panorama, and sound. Other media types may also be associated with a captured image that are not shown in FIG. 6, such as a slide show and a folder, for example.

A single image is an object that includes one image. A sound media type indicates that a sound clip is attached to the image that is displayed in the image area 422. A time lapse image, a burst image, a movie clip, a panorama, and a slide show, are objects that comprise several images stored sequentially in the same file. A folder is one or more images stored in the directory or folder. With multiple image media types, the image area 422 would display the first image in the group or a representative image from the folder, and the icon/information area 424 would display an graphical icon representing a slide show or folder, respectively.

As stated above, some types of conventional digital cameras name captured images by numbering the images starting with an initial number, such as the number one, up to some maximum number. Once the maximum number of images has been named, the user must delete or download the images, and the camera begins naming new images starting with the number one again.

This method for naming images creates naming conflicts when images are transferred to a host computer or a removable media from the camera, and when images are transferred to the camera from a host computer. In either case, stored images having the same names as the newly transferred images may be overwritten by the transferred image, and therefore lost.

The present invention provides method and system for minimizing image naming conflicts in a digital camera by assigning image identifiers to captured images that are unique for each digital camera. According to the present invention, the image identifiers are generated from a non-repeating number that is based on a count of the total number of images captured. As each image is captured, the count is incremented and the image identifier is associated with the captured image, so that the captured image is uniquely identified.

In another aspect of the present invention, the count of the total number of images captured is stored in a non-volatile writeable memory, such as an EEPROM (not shown in FIG. 3). Storing the count in the EEPROM maintains the count's value under all power conditions, including power failures.

Associating an image identifier with images based the total number of images captured by a camera may be implemented using a variety of methods. In a preferred embodiment, the unique image identifier is provided by generating an image name from the count and assigning the image name to the captured image. One way to generate the image name is to use the count of the total number of images as the image name. According to the present invention, however, each image name comprises the image count plus an additional identifier.

Figure 7:
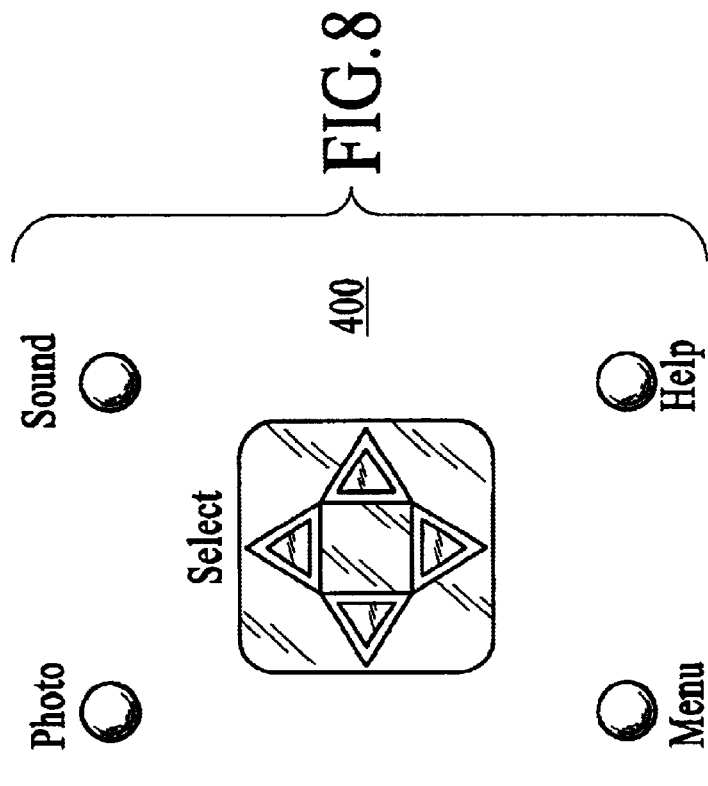
FIG. 7 is a diagram illustrating one preferred method for creating an image name from the total captured image count.

FIG. 7 is a diagram illustrating one preferred method for creating an image name from the total captured image count. According to the present invention, each image name 430 is eight characters in length, and includes a prefix 432, and an image number 434. The prefix 432 occupies the first two characters of the image name 430 and is used to identify the type of image. For example, the prefix "IM" may represent a single image, the prefix "BR" may represent a burst image, and the prefix "TL" may represent a time lapse image.

Following the prefix 432 in the image name 430 is the image number 434, which displays the image count of the total number of images captured by the digital camera. The image number 434 is preferably a six digit field, although other lengths are also suitable. If the image count is less than six digits in length, then the image number 434 is padded with the appropriate number of zeros. Alternately no padded zeros are used to make the image count easier to read.

Figure 8:
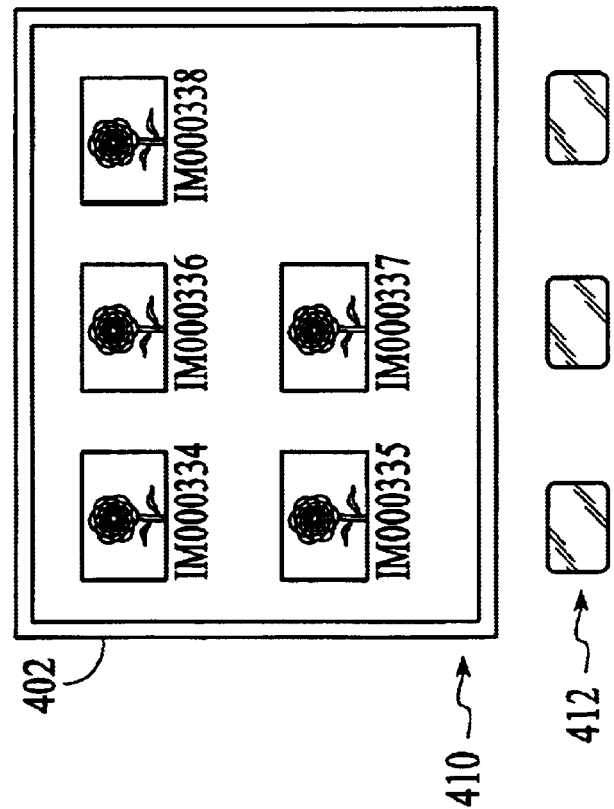
FIG. 8 is a diagram showing several images and their assigned image names displayed in the view finder 402 of the digital camera.

FIG. 8 is a diagram showing several images and their assigned image names displayed in the view finder 402 of the digital camera. As shown, each image has been assigned an image name 430 which uniquely identifies the image and prevents naming conflicts within the camera. According to the system and method disclosed herein, the present invention significantly reduces naming conflicts when transferring images to or from a host computer or a removable media because each image captured by the camera, whether new or old, is given a unique name.

In a second preferred embodiment, the image identifier is also based on the count, but rather than using the count to generate an image file name, the count is stored as part of the captured image data. As each new image is captured or downloaded into the camera, the count embedded in the image data of the new image is compared with the counts of the other images in the camera. If a conflict is detected, then the count for the new image is used to generate a unique image name 430 for the image, as described above.

A method and system for naming images in a digital camera has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for minimizing image naming conflicts in a digital camera that stores a plurality of images as image data, the method comprising the steps of:

(a) incrementing a count in response to an image being captured, the count being a non-repeating number of a total number of images captured by the digital camera;

(b) associating the count with the image data of the captured image;

(c) receiving image data from an external source, wherein the image data from the external source is associated with a count;

(d) comparing the count associated with the image data from the external source with the count associated with the image data of the captured image; and (e) in response to a conflict, automatically generating a unique image name for the image data from the external source using the count associated with the image data from the external source.

2. A method as in claim 1 wherein the digital camera includes a non-volatile memory, step (b) further including the step of:

(b1) storing the count in the non-volatile memory.

3. A method as in claim 2 wherein step (b) further includes the steps of:

(b2) embedding the count into the image data of the captured image.

4. A method as in claim 1 wherein the digital camera is capable of capturing different image types including a single image, a time lapse image, a burst image, a movie clip, a panorama, a slide show, and sound.

5. A digital camera for minimizing image naming conflicts, comprising:

a memory device for storing sets of image data, each set of image data corresponding to a captured image;

a user interface for displaying a plurality of image cells corresponding to the sets of image data, the user interface including means for capturing images;

a non-volatile memory for storing a count representing a total number of images captured by the digital camera;

input/output means for receiving new image data from an external source, wherein the new image data is associated with a count; and a processor coupled to the memory device, to the user interface, to the non-volatile memory, and the input/output means for controlling operation of the digital camera, the processor functioning to increment the count in response to an image being captured and for associating the count with the image data of the captured image, wherein in response to receiving the new image data from the external source, the processor compares the count associated with the new image data with the counts associated with the image data stored in the digital camera, and if a conflict is detected, the processor automatically generates a unique image name for the new image data using the new image data's respective count.

6. A digital camera as in claim 5 wherein the digital camera is capable of capturing different image types including a single image, a time lapse image, a burst image, a movie clip, a panorama, a slide show, and sound.

7. A method for minimizing image naming conflicts in a digital camera that stores a plurality of images as image data, the method comprising the steps of:

(a) incrementing a count in response to an image being captured, the count being a non-repeating number of a total number of images captured by the digital camera;

(b) associating the count with the image data of the captured image;

(c) receiving image data from an external source, wherein the image data from the external source is associated with a count;

(d) comparing the count associated with the image data from the external source with the count associated with the image data of the captured image; and (e) in response to a conflict, automatically generating a unique image name for the image data from the external source using the incremented count.

8. A digital camera for minimizing image naming conflicts, comprising:

a memory device for storing sets of image data, each set of image data corresponding to a captured image;

a user interface for displaying a plurality of image cells corresponding to the sets of image data, the user interface including means for capturing images;

a non-volatile memory for storing a count representing a total number of images captured by the digital camera;

input/output means for receiving new image data from an external source, wherein the new image data is associated with a count; and a processor coupled to the memory device, to the user interface, to the non-volatile memory, and the input/output means for controlling operation of the digital camera, the processor functioning to increment the count in response to an image being captured and for associating the count with the image data of the captured image, wherein in response to receiving the new image data from the external source, the processor compares the count associated with the new image data with the counts associated with the image data stored in the digital camera, and if a conflict is detected, the processor automatically generates a unique image name for the new image data using the count stored in the non-volatile memory.

* * * * *